United States Patent [19]
Tisma

[11] Patent Number: 5,247,778
[45] Date of Patent: Sep. 28, 1993

[54] SELF CLEANING STABILIZING OR ANTI-INERTIA MOUNT FOR HIGH SPEED AUTOMATIC PACKAGING MACHINE

[75] Inventor: Stevan Tisma, Elk Grove Village, Ill.

[73] Assignee: Tisma Machinery Corporation, Elk Grove Village, Ill.

[21] Appl. No.: 998,019

[22] Filed: Dec. 29, 1992

[51] Int. Cl.⁵ .................. B65B 37/02; B65B 39/14
[52] U.S. Cl. ............................ 53/167; 53/251;
53/255; 198/498; 198/793; 198/802; 141/140
[58] Field of Search ............. 53/167, 251, 506, 154,
53/493, 55, 154, 237, 247, 252, 255, 393;
141/140, 142; 198/793, 802, 494, 497, 498

[56] References Cited

U.S. PATENT DOCUMENTS

| | | | |
|---|---|---|---|
| 2,642,212 | 6/1953 | Currivan | 52/252 |
| 2,729,380 | 1/1956 | Malhiot | 198/498 X |
| 2,766,979 | 10/1956 | Calder | 198/498 X |
| 3,091,903 | 6/1963 | Kammerer | 53/260 |
| 3,317,029 | 5/1967 | Goldammer et al. | 198/802 |
| 3,608,701 | 9/1971 | Dieter | 198/802 |
| 3,906,705 | 9/1975 | Beck et al. | 53/252 |
| 4,333,297 | 6/1982 | Küttenbaum et al. | 53/252 |
| 4,856,566 | 8/1989 | Tisma | 141/140 X |
| 4,890,724 | 1/1990 | Loewenthal | 198/802 X |
| 4,982,556 | 4/1991 | Tisma | 53/251 X |
| 5,144,790 | 9/1992 | Tisma | 53/251 |

Primary Examiner—Horace M. Culver
Attorney, Agent, or Firm—Laff, Whitesel, Conte & Saret

[57] ABSTRACT

The invention provides a mount for attachment to a link chain conveyor, especially—but not exclusively—for use in an automatic packaging machine. The mount has two pivot points of attachment to prevent unwanted motion caused by centrifugal forces as the mount circles a sprocket wheel. One of the two pivot points is a pair of tracks having wear resistant nylon blocks mounted on them to provide lost motion. Responsive to each lost motion extension, the block rubs the tracks to clean them of debris.

11 Claims, 5 Drawing Sheets

SELF CLEANING STABILIZING OR ANTI-INERTIA MOUNT FOR HIGH SPEED AUTOMATIC PACKAGING MACHINE

This invention relates to high speed automatic packaging machines and more particularly to stabilizing or anti-inertia mounts for counteracting centrifugal force generated by the transports for such machines.

This invention is an improvement over U.S. Pat. No. 5,144,790. Other patents relating to this and similar types of automatic packaging machines are: U.S. Pat. Nos. 3,317,029; 3,608,701; 4,578,929; 4,713,928; 4,716,714; 4,738,081; 4,745,732; 4,829,751; 4,856,566; 4,890,724; 4,982,556; 5,010,929; and 5,058,634.

Automatic packaging machines usually have a magazine filled with cardboard blanks which are picked up, one at a time, by vacuum cups, formed into boxes, and inserted into individual mandrels. Link chain conveyors carry the mandrels past various work stations, where the boxes are filled with product, closed, sealed, and discharged. After the filled boxes are discharged, the mandrels circle back to receive the next empty boxes. Other link chains carry other mandrels, fill cups, transfer funnels and the like.

These link chains normally form long, somewhat oval, closed transport paths having two spaced parallel side paths joined at their ends by a semi-circular pattern where the chain goes around a sprocket wheel which causes centrifugal forces at the ends of the transport path. Since the measure cups, mandrels, funnels, etc. ("mandrels") are bolted to the chain, they endlessly circle about the transport path. Usually, the mandrels have a rectangular or other suitable cross section and are attached to the chain at the center of such cross section. Perhaps the width of the mandrel may sometimes be in the order of the radius of the circle formed by the sprocket wheel. This means that the ends of the cross section are free to separate and jerk away from and toward the chain as the mandrels go around the circular pattern.

If the mandrels are small enough, and the load which they carry is light enough, no problem results from the centrifugal forces. However, when the mandrels are large and heavy to carry, say, ten pounds of sugar, for example, there are problems if attempts are made to build a faster loading machine (i.e. the link chains are driven faster).

At some point, centrifugal forces acting on the centrally supported mandrel flings the ends of the mandrel away from the chain by a significant distance as it goes around the circular path. When a large and heavy mandrel leaves the circular path and then returns to the straight sides of the transport path, it rebounds and strikes a heavy blow against the chain and its supporting structure. Heretofore, the speed at which the automatic packaging machine can operate has been restricted by the centrifugal forces which so tend to fling the ends of the mandrel outwardly and then cause the rebound.

The U.S. Pat. No. 5,144,790 shows a stabilizing or anti-inertia bar with two joints, first a pivot point on a leading end and second a lost motion slip joint on the trailing end of the bar. This bar works very well in most environments. However, in other environments, there is enough foreign material in the air and around the packing machine to accumulate in the joints and especially in the second and lost motion slip joint. For example, if the material being packaged is a fluffy food product such as pabulum, the material accumulated in the joints may become a breeding ground for bacteria. If the material being packaged is abrasive, there may be mechanical wear, especially in the lost motion slip joint. If the material being packaged is sticky or viscous, there may be a high resistance to necessary mechanical motion.

Accordingly, an object of the invention is to provide a new and improved stabilizing or anti-inertia bar for counteracting centrifugal forces. Another object is to provide a stabilizing or anti-inertia bar with self cleaning joints. In this connection, an object is to provide a covered lost motion slip joint which will be less inclined to accumulate foreign material.

Another object of the invention is to provide a stabilizing or anti-inertia bar in the form of a standard module to which any of many different kinds of equipment may be attached. Here, an object is to enable the inertia bar to be removed and attached with only a small amount of work.

In keeping with an aspect of this invention, these and other objects are accomplished by a use of a basic link chain conveyor which may be made in any of many different standard sizes and assembled into different conveyor configurations. These chain modules may be adapted to transport different types of standardized mandrels for carrying different kinds of products to many work stations where product is dumped into mandrels and then the contents of the mandrels are dumped into boxes, for example. A novel means for mounting mandrels on the link chain involves a bar having a C-shaped cross section with a pivot connection on a leading edge and with a guide pin in a lost motion unit for stabilizing the trailing edge of the mandrel. The lost motion unit is a metal block having upper and lower tracks with nylon blocks sliding in them. During each lost motion excursion, the blocks slide back and forth to clean foreign material out of the tracks. This form of mounting means virtually eliminate problems of centrifugal forces flinging the mandrel away from and then slamming it into the transport chain. It also prevents a build up of foreign material at a lost motion connection.

A preferred embodiment of the invention may be understood from the attached drawings, in which:

FIG. 1 is a perspective view of an automatic packaging machine which is shown and described in U.S. Pat. Nos. 4,856,566 and 5,144,790.

FIG. 2 shows how the mandrel with the prior art mount behaves responsive to centrifugal forces which appear as it goes around the circle formed by the sprocket wheel at the end of the elongated oval transport path;

FIG. 3 is an exploded view of a prior art mandrel and its support, as shown in U.S. Pat. No. 5,144,790;

Figure 1:
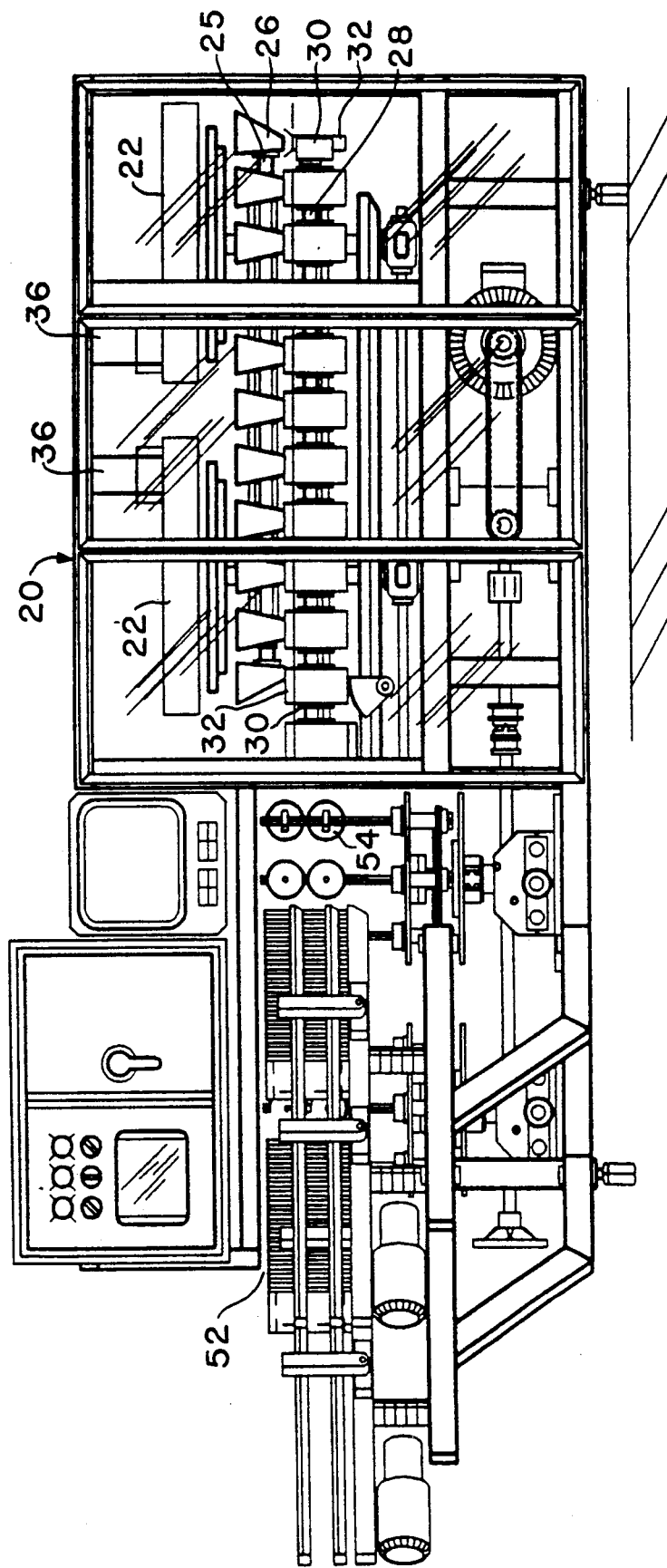

FIG. 1 discloses an automatic packaging machine, which may incorporate the invention. This machine is also shown and described in U.S. Pat. Nos. 4,856,566; and 5,144,790. The superstructure 20 has two conveyors in the form of merry-go-rounds 22,22 for carrying a number of bottomless volumetric or measuring cups. An endless conveyor 25 carries a number of bottomless wear resistant transfer funnels or chutes 26 which travel under and in alignment with the measuring cups. A conveyor chain 28 carries a number of mandrels 30 for transporting boxes 32 past a fill station, in alignment with the traveling funnels or chutes 26 in order to guide and direct product falling from bottomless transfer cups into boxes 32.

The remaining parts of FIG. 1 are jack screws 36,36 which may raise or lower the merry-go-round 22 to accommodate various sizes of measuring caps. Two magazines 52 store cardboard blanks which are picked up by suction cup feeders 54 that thereafter press the blanks into the mandrels 30, forming them into boxes, in the process. This figure illustrates a number of different places where link chain transports convey mandrels that may employ the inventive connector.

The problem which the invention addresses is illustrated at 132 (FIG. 2) where centrifugal force causes mandrel 132 to try to swing outwardly in direction E and to slam back in direction F as the mandrel goes around the circle defined by a sprocket wheel at the end 134 of a long oval transport track. As here shown, mandrels 138 are traveling without problems along straight sections of the conveyor chain 62. However, when the mandrel 140 enters upon the circular end section 134, there is a strong centrifugal force tending to rotate the mandrel in direction G. There may be a jerkiness as the mandrel swings back and forth in directions E,F, when it circles in the position 134 of the track end sprocket wheel. When the mandrel returns to the straight section at position 142, the swinging mandrel slams into the conveyor at point 144 with a blow here represented by the arrow H. With this kind of action, the mandrel may soon hammer itself out of shape and greatly damage the conveyor chain, especially when the mandrel is carrying heavy loads such as five or ten pounds, for example.

Heretofore, this hammering has limited the speed of the automatic packaging machine to levels which cause a smooth transit of the circular regions. The invention of U.S. Pat. No. 5,144,790 provides a means for increasing the speed of the packaging machine by a factor which may be in the order of 100%, for example.

The connector 150 (FIG. 3) of U.S. Pat. No. 5,144,790 replaces the prior art connector 90 of FIG. 2 in order to cope with the centrifugal forces acting upon the mandrel. In greater detail, as best seen in FIG. 3, the connector 150 comprises an angle iron 152 bolted across the back of the mandrel 154. Dependent from the angle iron 152 are pivot and guide pins 156, 158 On the opposite ends of the bar 152. Two slide block pieces of metal 90a and 90b are bolted to the conveyor chain at positions corresponding to the space between pivot and guide pins 156, 158. A pivot block 160 is bolted to slide block 90a. A guide block 162 is bolted to slide block 90b. The pivot block has a hole 164 for receiving pivot pin 156, thereby making a hinge connection between the leading edge of the mandrel and the conveyor chain. The guide block 162 includes a slot 166 which is long enough to provide travel for the guide pin as the mandrel traverses the circular path at 134.

Figure 4:
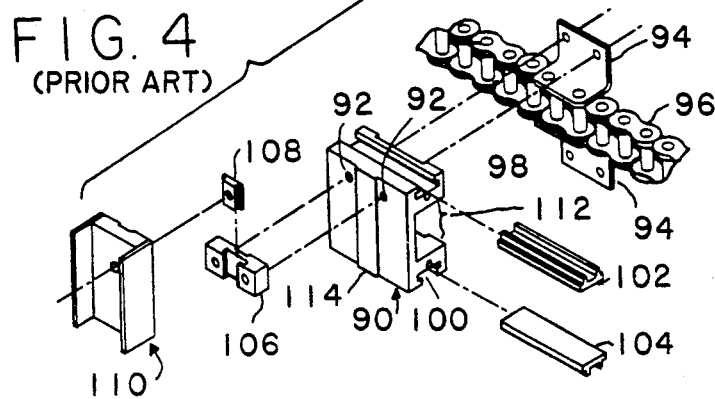
FIG. 4 is a perspective view of a prior art connector module which may be bolted to a link chain conveyor.

FIG. 4 shows the equipment for mounting the structure on a conveyor chain. In greater detail, a slide block 90 (i.e. a single piece of metal) may be either a machined or die cast part, for example. Bolt holes 92 enable the part 90 to be bolted to mounting brackets 94 on the link chain conveyor 96. The part 90 includes upper and lower T-shaped slots 98, 100 into which nylon tracks 102, 104 slide in order to ride on rails (not shown) adjacent conveyor chain 96. These rails carry the weight of the conveyor chain and the mandrels attached thereto. A mating coupler 106, 108 is provided to enable any suitable mandrel 110 to be slipped into and then latched in place, for example. The conveyor link chain fits into the channel 112 in slide block 90. Various embossments and guideways are provided to index and maintain a proper position alignment between the conveyor chain 96, connectors 106, 108 and mandrel 110.

Figure 5:
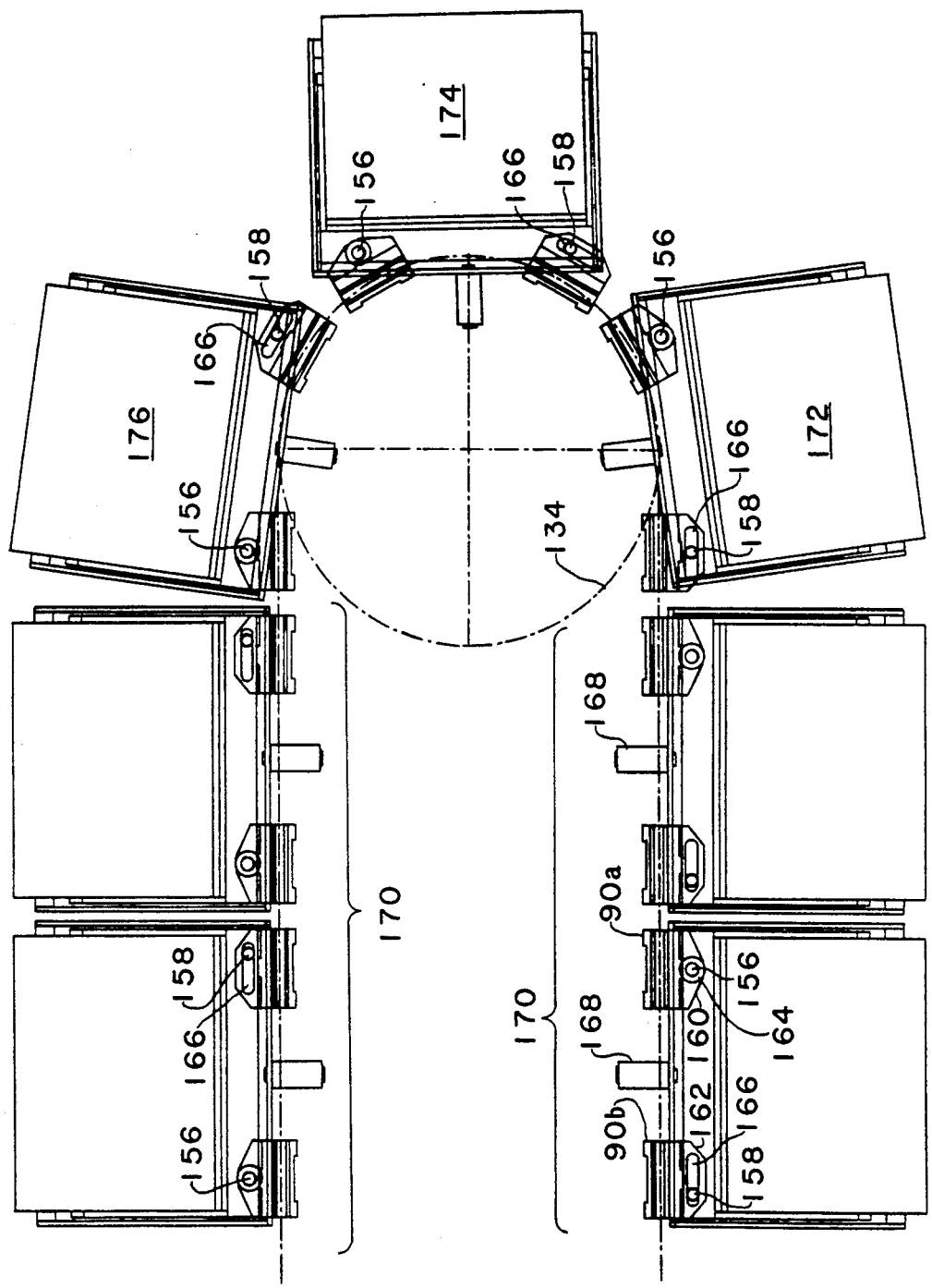
FIG. 5 shows how the mandrel of FIG. 3 behaves responsive to centrifugal forces when it is mounted on the inventive connector of FIG. 3.

The operation of the connector of FIG. 3 is seen in FIG. 5. In the two regions 170, the mandrels are following a straight section of the transport path being pulled along by pivot pin 156 and with guide pin 158 in the trailing end of slot 166. When the mandrel 172 reaches the circular section 134 of the transport path, it is still being pulled by the pivot pin 156 while the guide pin 158 moves to the center of guide slot 166. At the center of the circular path 134, the mandrel 174 is being pulled by pivot pin 156, while guide pin 158 has moved to the leading end of guide slot 166. As the mandrel 176 moves back onto the straight section 170 of the transport path the guide pin 158 is moving back through the slot 166, to the trailing edge thereof.

Figure 2:
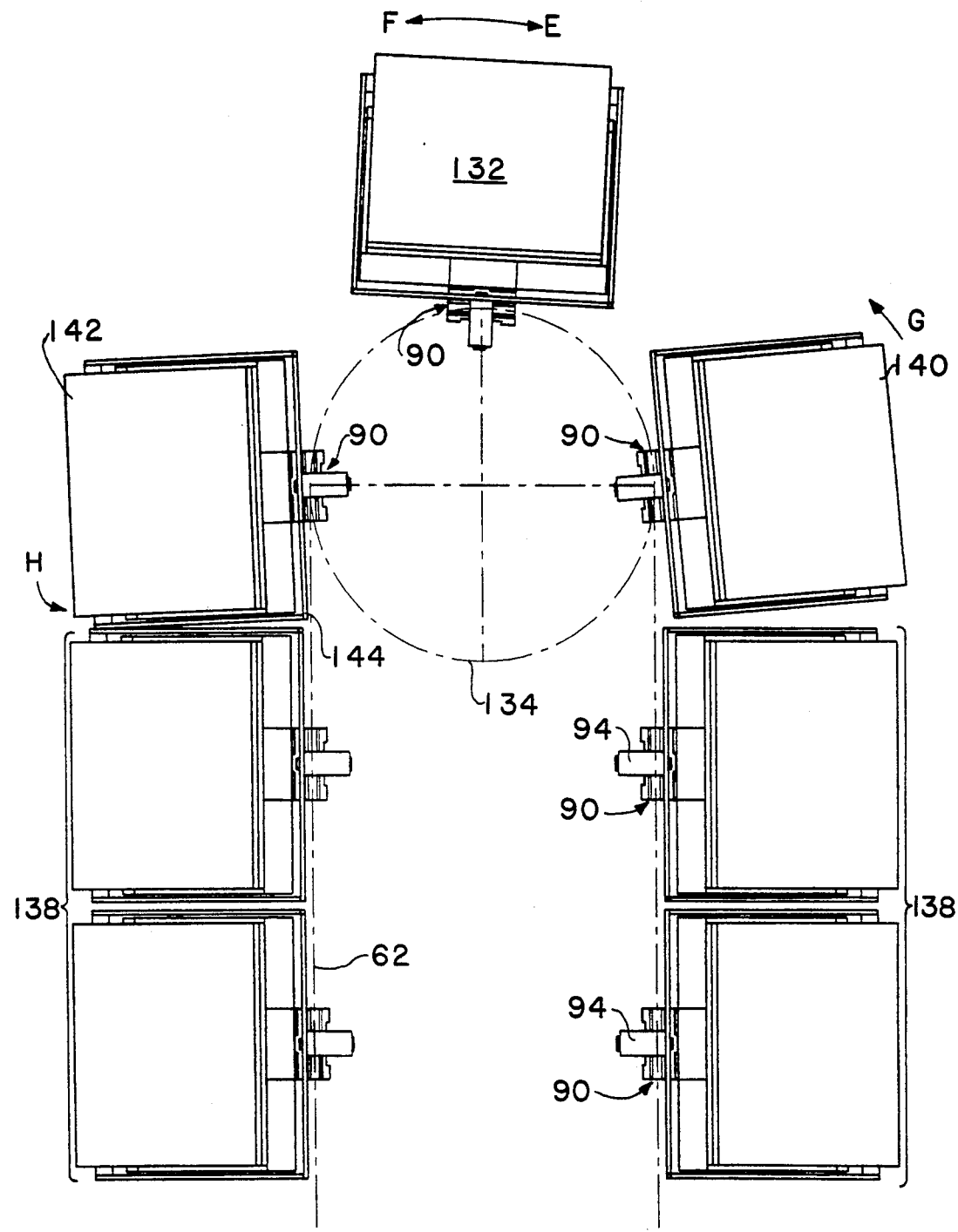
Figure 3:
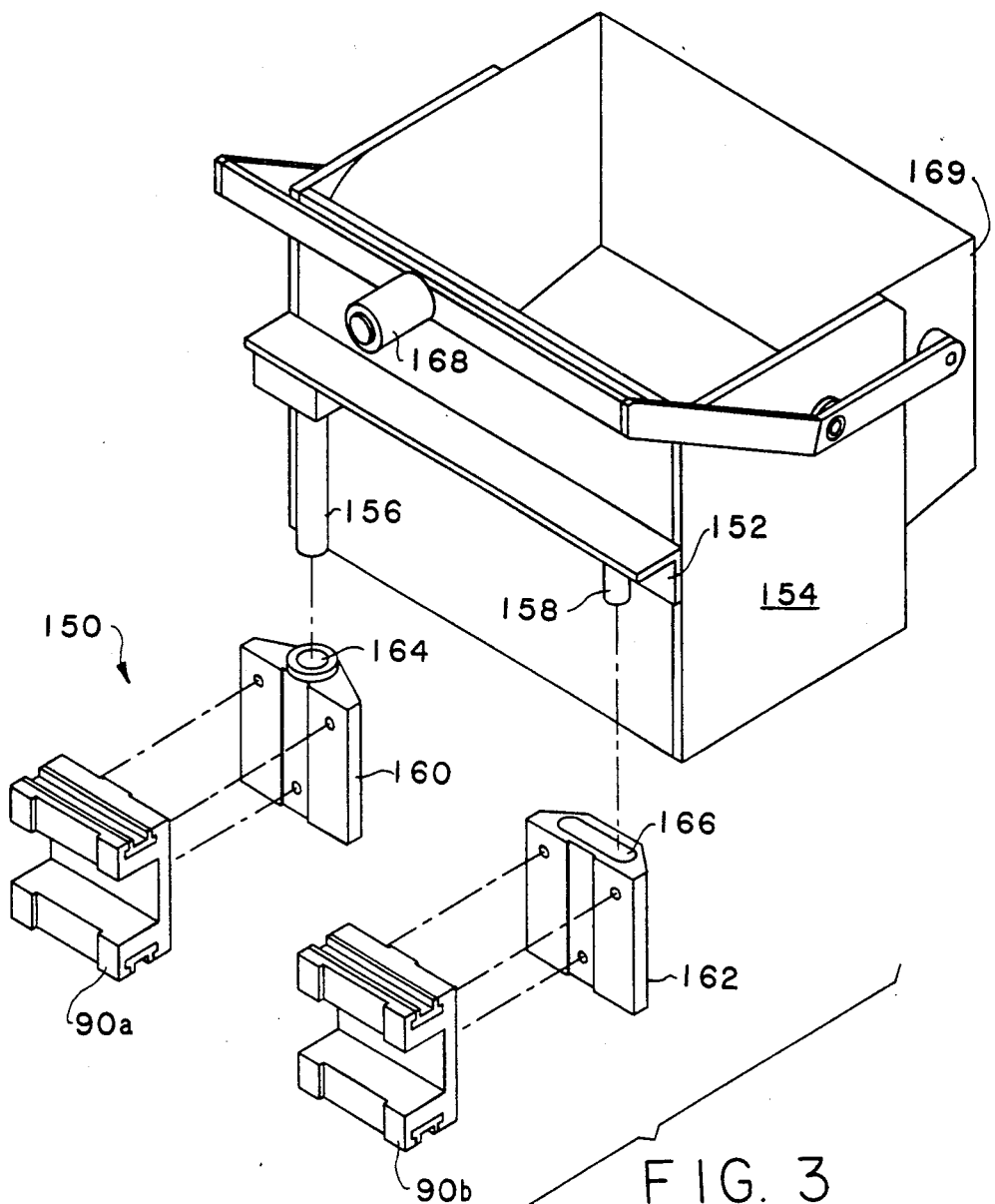

The point is that the two ends of the mandrel are always tied to the conveyor chain so that there is none of the whipping back and forth which is exhibited in FIG. 2. When the mandrel returns to the straight section, the force represented by arrow H (FIG. 2) is minimal because the pins 156, 158 are held in close proximity to and do not substantially depart from the transport path.

The problem addressed by the invention is seen in FIG. 5 which is a top plan view. Anything may fall into the openings for receiving pins 156 and 158. For example, if the product being loaded is a light and fluffy food such as pabulum, it may rain down into the slot 166, to create an environment in which bacteria may grow. If the product being loaded has any grit on other abrasive character, the slot 166 and pin 158 may be worn. If the product is viscose, sticky or gummy, it may simply fowl the mechanism.

Figure 6:
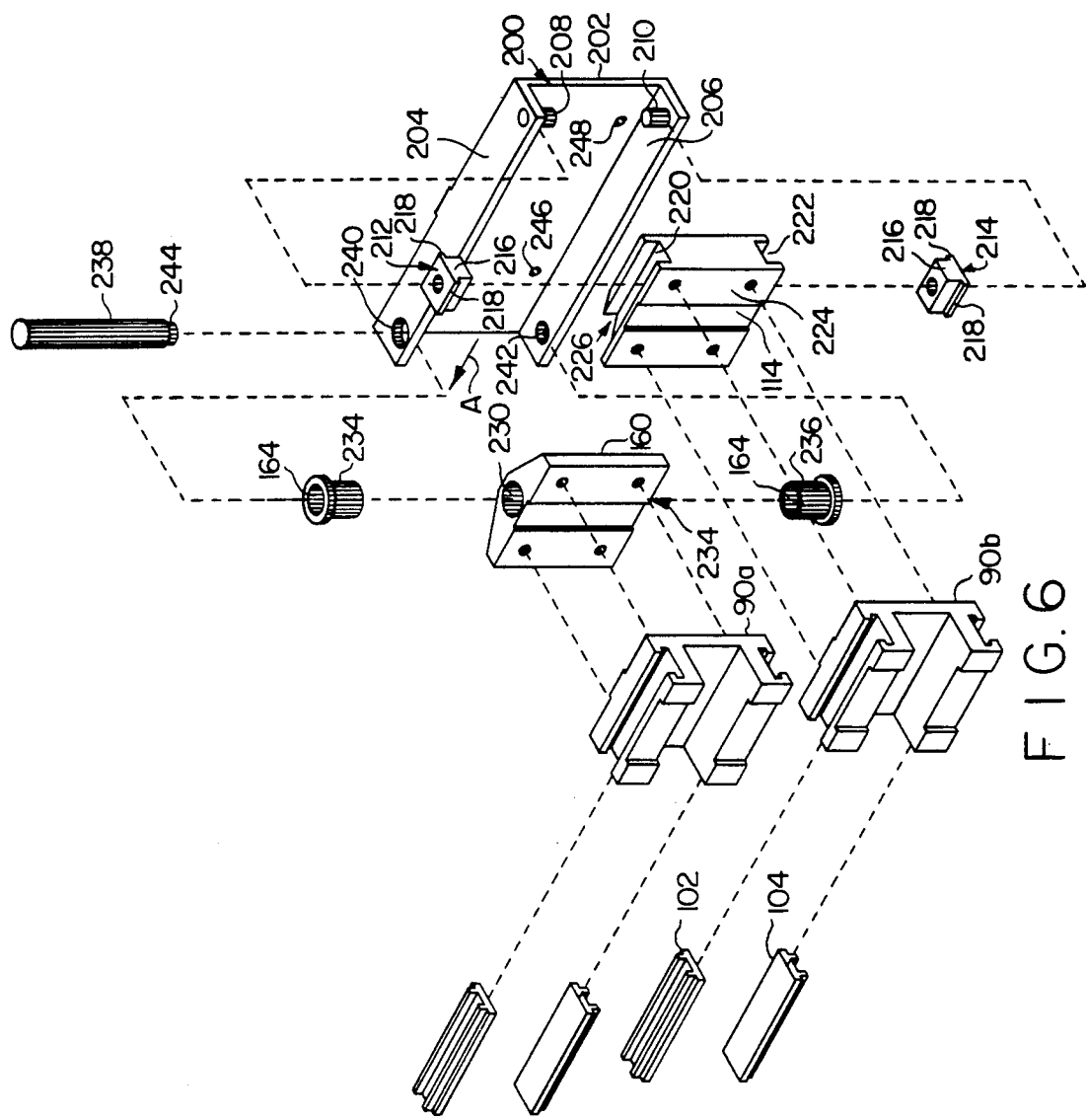
FIG. 6 is an exploded view of the inventive stabilizing or anti-inertia support with the self cleaning lost motion linkage.

The inventive solution to these and similar problems is shown in FIG. 6. A generally somewhat C-shaped channel 200 has a back plate 202 and upper and lower flanges 204, 206. The C-shaped channel 200 travels in the direction of arrow A as it moves in the automatic packaging machine. On one end (the trailing), the upper and lower flanges 204, 206 have inwardly directed and axially aligned posts 208, 210.

Guide block 224 is bolted to the slide block 90b. Upper and lower tracks 220, 222 are machined or otherwise formed in the block 224 to receive the nylon blocks 212, 214. Each of these tracks extend generally parallel to flanges 208, 210 of the C-shaped channel 200. The guide block 224 has a bias cut at 226 so that the block may pivot toward back plate 202 as the mandrel circles the sprocket wheel at the end of the conveyor.

Traveling means, in the form of wear resistant nylon blocks 212, 214, have a generally T-shaped cross section with holes formed therein for fitting over the inwardly directed posts 208, 210, respectively. At the stem of the T-shape, each of the nylon blocks 212, 214 has a first section 216 which fits within associated upper and lower tracks 220, 222 of a guide block 224. The arms 218 of the T-shape nylon blocks 212, 214 are flanges which fit over the rails of tracks 220, 222 and help keep them clean.

The dimensions of blocks 212, 214 are such that they fit fairly snugly within the dimensions of the tracks 220, 222. Therefore, the guide blocks are free to slide back and forth as the mandrel circles the sprocket wheel, thereby performing the function of the pin 158 (FIG. 3) sliding in slot 166 of guide block 162. The sliding motion of blocks 212, 214 will be apparent from an inspection of how pin 158 (FIG. 5) slides in slot 166, while the mandrel circles the sprocket wheel 134. Each time that the nylon wear resistant blocks 212, 214 slide in tracks 220, 222, the blocks clean the tracks so that no debris will build up in them.

At the leading end of C-shaped channel 200 and on the opposite ends of pivot block 160, a pair of axially aligned holes nylon bearings 234, 236 fit into a pivot hole at 230, 232. The pivot block 160, with bearings 234, 236 in place, fits between holes 240, 242 in upper and lower flanges 204, 206 of the C-shaped channel 200. A pin 238 is passed through hole 240 in flange 204, holes 164 in the nylon bearings 234, 236, and hole 242 in flange 206. A step 244 on the bottom of the pivot pin 238 limits the downward travel as it is put into place in holes 240, 242.

At bolt holes 246, 248 (and above them an aligned pair of bolt holes not visible in FIG. 6), the mandrel or other appropriate device bolts onto back plate 202 of the C-shaped channel 200. (The mandrel will be on the right hand side of plate 202, as viewed in FIG. 6.) To quickly and easily remove the mandrel from the conveyor chain, the pin 238 is pulled out of the holes 242, 164, 240 and the C-shaped channel 200 is slid to either the right or left until the wear resistant nylon blocks 214, 216 are freed from the tracks 220, 222. To return the mandrel to its association with the conveyor chain, the nylon wear blocks are fitted over pins 208, 210 and the tracks 220, 222 are slid over the blocks. Then, the pin 238 is pressed through the holes 240, 242 and holes 164 in nylon bearings 234, 236.

Those who are skilled in the art will readily perceive how to modify the invention. Therefore, the appended claims are to be construed to cover all equivalent structures which fall within the true scope and spirit of the invention.

The claimed invention is:

1. A self-cleaning stabilizing mount for an automatic packaging machine comprising a link chain conveyor, an elongated C-shaped channel having pivot means on each of its opposite ends for attaching said channel to said conveyor, said channel traveling in a given direction as said conveyor moves, one of said pivot means having at least one associated track for enabling said one pivot means to experience a lost motion as said conveyor chain moves, and means associated with said track and said one pivot means for cleaning said track as said lost motion occurs.

2. The mount of claim 1 wherein said pivot means with lost motion is at the trailing end of said C-shaped channel with respect to said given direction of travel.

3. The mount of claim 1, wherein said C-shaped channels have upper and lower flanges which fit over and protect said pivot means from debris falling therein.

4. The mount of claim 3 wherein said one pivot means comprises a block of metal having upper and lower tracks which are generally supported in a spaced parallel relationship to said upper and lower flanges, and said lost motion means comprises wear resistant blocks dimensioned to slide in said tracks to provide said lost motion, while rubbing the track to clean it of debris.

5. The mount of claim 4 wherein each of said tracks comprises a somewhat U-shaped channel with guide rails at the top of the U-shape, and each of said wear resistant blocks has a somewhat T-shape which fits fairly snugly over the top of the guide rails and down into the U-shape, whereby debris are restricted from entry into a space between the track and wear resistant block.

6. The mount of claim 5 wherein said metal block has a bias cut at one end to provide relief so that said C-shaped channel and said tracks may swing relative to each other at said one pivot means.

7. The mount of claim 5 and means at said other of said pivot points for attaching said C-shaped channel to said conveyor responsive to an insertion of a pin, whereby said C-shaped channel may be attached to or detached from said conveyor by inserting or removing said pin and by sliding said wear resistant blocks in said tracks.

8. A mount for enabling an elongated object attached to a link chain to encircle a sprocket wheel without an undue amount of unwanted motion, said mount comprising an elongated bar having a semi-closed space on at least one end, a lost motion attaching means in said space, said attaching means having tracks on opposite sides to enable a motion parallel to the elongation of said bar, traveling means for moving over said tracks to provide said lost motion, and means for pivotedly attaching said traveling means to at least one interior wall forming said semi-closed space, said traveling means fitting said tracks fairly snugly to clean them on each lost motion movement of said traveling means.

9. The mount of claim 8 and quick connect means for attaching the other end of said elongated object to a link chain, whereby said elongated means may be attached to or removed from said link chain by operating said quick connect means and sliding said traveling means onto or off of said track.

10. The mount of claim 9 wherein said tracks are U-shaped channels, and said tracking means are a pair of wear resistant blocks sliding in said U-shaped channel.

11. The mount of claim 10 wherein each of said wear resistant blocks has a shape which covers said rails and fills said U-shaped channels in order to resist entry of foreign matter between said blocks and tracks.

* * * * *